United States Patent
Ramos-Elizondo

(10) Patent No.: US 9,438,772 B2
(45) Date of Patent: Sep. 6, 2016

(54) AUTOMATED METHOD AND APPARATUS FOR OBTAINING 2D SILHOUETTES FROM ONE OR MORE 3D OBJECTS

(71) Applicant: RFID Mexico, S.A. de C.V., San Pedro Garza Garcia (NL)

(72) Inventor: Rafael-Guillermo Ramos-Elizondo, Monterrey (MX)

(73) Assignee: RFID MEXICO, S.A. DE C.V., Nuevo Leon (MX)

( * ) Notice: Subject to any disclaimer, the term of this patent is extended or adjusted under 35 U.S.C. 154(b) by 637 days.

(21) Appl. No.: 13/729,131

(22) Filed: Dec. 28, 2012

(65) Prior Publication Data

US 2013/0169804 A1    Jul. 4, 2013

Related U.S. Application Data

(60) Provisional application No. 61/580,956, filed on Dec. 28, 2011.

(51) Int. Cl.
*H04N 5/225* (2006.01)

(52) U.S. Cl.
CPC ..................... *H04N 5/225* (2013.01)

(58) Field of Classification Search
CPC ........................................................ H04N 5/225
USPC .......................................................... 348/143
See application file for complete search history.

(56) References Cited

U.S. PATENT DOCUMENTS

| | | | | |
|---|---|---|---|---|
| 5,878,151 | A * | 3/1999 | Tang | G06K 9/209 348/125 |
| 6,055,329 | A * | 4/2000 | Mufti | G01B 9/08 250/559.12 |
| 2003/0174286 | A1* | 9/2003 | Trumbull | G06F 3/011 352/243 |
| 2006/0209365 | A1* | 9/2006 | Lee | H04N 1/00795 358/486 |
| 2007/0235541 | A1* | 10/2007 | Hall, Jr. | H04N 1/00002 235/454 |
| 2008/0030814 | A1* | 2/2008 | Ohara | H04N 1/4074 358/522 |
| 2011/0085215 | A1* | 4/2011 | Hiraide | G02B 21/26 358/486 |

* cited by examiner

*Primary Examiner* — Behrooz Senfi
(74) *Attorney, Agent, or Firm* — Young & Thompson

(57) ABSTRACT

A method and apparatus for obtaining 2D silhouettes from one or more 3D objects, which uses an image acquisition unit having a telecentric lens system that is able to fully scan an object in one dimension.

15 Claims, 1 Drawing Sheet

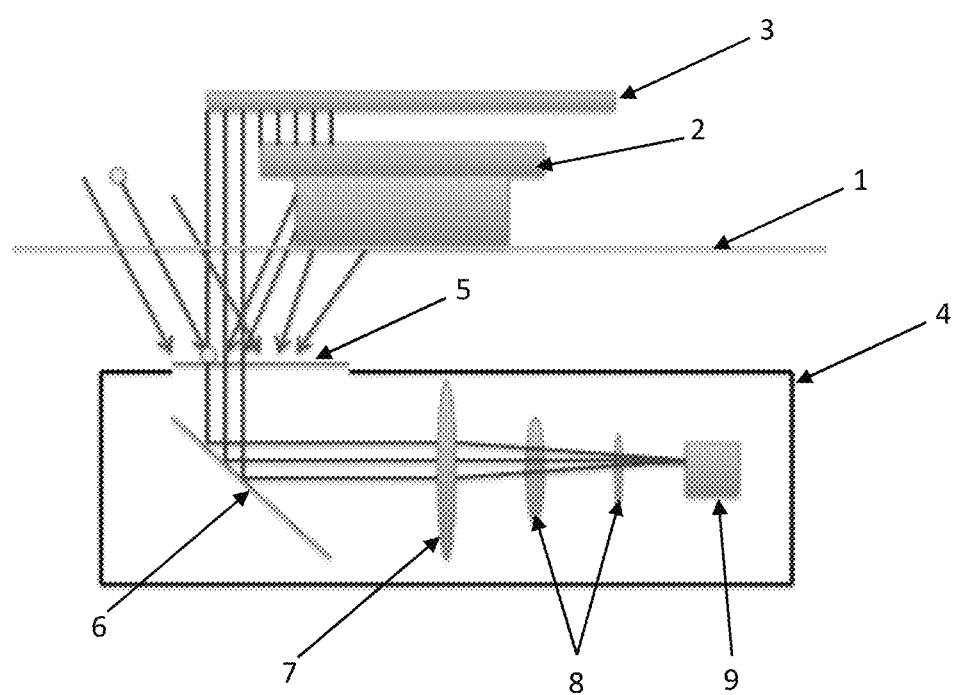

AUTOMATED METHOD AND APPARATUS FOR OBTAINING 2D SILHOUETTES FROM ONE OR MORE 3D OBJECTS

BACKGROUND OF THE INVENTION

A. Field of the Invention

The present invention is related to imaging methods and apparatuses and more particularly to a method and apparatus for obtaining 2D silhouettes from one or more 3D objects.

B. Description of the Related Art

Obtaining accurate 2D contours of a 3D object is traditionally accomplished via a traditional (focusing camera) optical system, these image acquisition systems employ a lens that focuses light at an imaging sensor allowing for an image of an object larger than the lens or the sensor, to be captured in a single action, without the need to move the camera system.

This process is not optimal for producing a real 2d representation of an object, because it introduces projection errors that distort the dimensions of the objects farther or closer to the lens. This is to say, that an object closer to the lens will be shown larger than an identical object placed farther away from the lens. Although this can be compensated in flat objects by placing a reference in the same plane of capture, a 3D object does not have a single plane of capture hence complicating this kind of approach (a cone with its point toward the lens can actually be seen as a tube if it is close enough to the lens).

Furthermore, since the point of capture can be occluded by the same object being captured, a bigger protrusion on the back of the object can be covered by a smaller one closer to the lens.

This usually requires a great deal of manual labor after the capture is done and requires access to the object being captured, negating some of the advantages of an automated capture process.

There are special lenses that capture only the light travelling perpendicular to the lens, this allows for an accurate representation of the 3d object but can only accurately capture an object that is slightly smaller than the actual lens size. Because of this limitation and the size of theft construction relative to the capture size, these lenses are not practical for medium to large scale objects, and are only useful to inspect smaller objects like microelectronics or small screws and pipes.

In view of the above referred problems, applicant developed a method and apparatus for obtaining 2D silhouettes from one or more 3D objects, which uses an image acquisition unit having a telecentric lens system that is able to fully scan an object in one dimension.

The lens used in the method and apparatus of the present invention, only captures light travelling perpendicular to its surface and therefore, it doesn't suffer the projection distortion commonly associated with regular imaging systems.

SUMMARY OF THE INVENTION

It is a main objet of the present invention to provide a method and apparatus for obtaining 2D silhouettes from one or more 3D objects, which uses a telecentric lens that is able to fully scan an object in one dimension.

It is another main object of the present invention to provide a method and apparatus of the above referred nature in which the lens only captures light travelling perpendicular to its surface and therefore, it doesn't suffer the projection distortion commonly associated with regular imaging systems.

These and other objects and advantages of the method and apparatus for obtaining 2D silhouettes from one or more 3D objects of the present invention will become apparent to those persons having an ordinary skill in the art, from the following detailed description of the embodiments of the invention which will be made with reference to the accompanying drawings.

BRIEF DESCRIPTION OF THE DRAWINGS

FIG. 1 is a diagram of the apparatus for obtaining 2D silhouettes from one or more 3D objects of the present invention.

DETAILED DESCRIPTION OF THE INVENTION

The method and apparatus for obtaining 2D silhouettes from one or more 3D objects of the present invention will be described making reference to the accompanying drawings and to a preferred embodiment thereof and to the accompanying drawings.

The apparatus for obtaining 2D silhouettes from one or more 3D objects of the present invention comprises:

a supporting structure (not shown);

a transparent capture surface "1" attached to the supporting structure, where the objects "2" to be scanned are placed, said transparent capture surface "1" comprises a high strength glass sheet;

a backlight "3" located directly over the transparent capture surface "1";

an image acquisition unit "4" using a telecentric lens system, located directly below the transparent capture surface "1" and movable along the length of the transparent capture surface "1", said imaging acquisition unit "4" mounted over a mechanism (not shown) for automatically moving the imaging acquisition unit "4" along the length of the transparent capture surface "1" as needed for scanning an object placed over the transparent capture surface "1", said image acquisition unit comprising:

a first telecentric lens "5", located parallel to the transparent capture surface "1";

a mirror "6" located below the first telecentric lens "5" at an angle of 45° or approximately 45° with respect to an axis located parallel to the transparent capture surface "1", said mirror "6" deflecting the light entering the image acquisition unit through the first telecentric lens "5", at an angle of 90°;

a focusing lens "7" located next to the mirror "6" and perpendicular to the first telecentric lens "5", perpendicularly receiving the light deflected by the mirror "6";

one or more telecentric lenses "8" located next to the focusing lens and parallel to the focusing lens "7", said one or more telecentric lenses "8" perpendicularly receiving the light passing through the focusing lens "7", and focusing the light on a specific point;

an image sensor "9", located next to the one or more telecentric lenses "8" and parallel to the one or more telecentric lenses "8", receiving the light focused by said one or more telecentric lens "8" (comprising the optical image), said imaging sensor "9" capturing the optical image and converting said optical image into an electronic signal and provides the electronic signal to electronic processing means (not shown).

a mechanism (not shown) for automatically moving the imaging acquisition unit "4" along the length of the transparent capture surface "1", said mechanism comprising one or more motors a feedback system, said mechanism connected to electronic control means.

The transparent capture surface "1" may also be made of any hard material such as polycarbonate.

The backlight "3" illuminates the object "2" from behind and will help the image acquisition in having a greater contrast where the object "2" blocks the light, this eliminates the possibility of having to differentiate between the background a part of the object "2" that has the same color as the background. The backlight "3" can be of a specific wavelength and a filter can be placed in the adjusting optics to filter out ambient light. The backlight "3" may also be of a telecentric type thus only emitting light perpendicular to its surface and eliminating other artifacts from the image capture.

The telecentric lenses "5", "8", only receive light perpendicular to its surface and therefore, they don't have the projection distortion commonly associated with regular imaging systems. Furthermore, they can be used thin Fresnel type lens that allows for a large format without the weight, thickness and cost that would be associated with a glass lens.

They can be added one or more absolute position sensors (not shown) located along the path of the movable image acquisition unit, for obtaining position information of the movable image acquisition unit, and provide said position information to the mechanism in order to improve position accuracy and reliability without the need of manual adjustments.

The sensor "9" captures an optical image that changes as the image acquisition unit "4" moves along the length of the transparent capture surface and send the electronic signals corresponding to the image in the form of sequential scanning information to the electronic processing means (not shown) for processing the electronic signals.

Although it was described that the image acquisition unit "4" moves only in one axis, namely an "X" axis (along the length of the transparent capture surface), it can be provided a mechanism (not shown) that allows the image acquisition unit "4" to move in two axis, namely an "X" and a "Y" axis (along the width of the transparent capture surface).

The electronic processing means, receive the sequential scanning information and process it in order to produce a file that contains a group of data structures describing different aspects of the scanned object such as the object silhouette described in a vector format, a photograph of the scanned object, minimum size of a box that would contain the object having the minimum needed dimensions for enclosing the object. Optionally, it can be saved the weight, name and several other relevant characteristics.

In other embodiments of the invention, the telecentric lenses of the image acquisition unit may be of such size that it is not necessary to move the image acquisition unit in order to capture the an image size corresponding to the whole transparent capture surface.

The electronic processing means related with the above described apparatus follow the following method for processing the electronic signals:

a) obtaining sequential scanning information from the image acquisition unit having one or more telecentric lens comprising one or more files containing a raster image corresponding to the image being scanned by the image acquisition unit as it moves along a scanning area;

b) provide each file containing a raster image, with positioning information corresponding to the position of the image acquisition unit corresponding to the raster image, obtained from absolute position sensors located along the path of the movable image acquisition unit;

c) sequentially assembling the one or more files containing a raster image, in accordance with its positioning information in one main image file corresponding to a complete image of the scanning area, preserving the positioning information of each raster image;

d) adjusting the contrast of the main image file by means of any suitable software filter, until the contour of the scanned object is defined and the image is able to be processed by a software filter for obtaining the outer edges of an object contained in an image file;

e) removing dust or blemishes from the main image file by employing any known software filter that removes artifacts smaller than a preset size and characteristics;

f) detecting individual forms representing separate objects in the main image file, and separating each individual form in a separate image file, further including in each separate image file, the positioning information of each raster image in the main image file and saving the actual space that said individual forms occupied in the main image file, by using a software filter; and g) obtaining the outer edges of the individual forms contained in each separate image file using any suitable software filter, and for each separate image file, generating a file containing the description of geometric elements that better represent the outer edges of the object contained in the correspondent separate file and the position information of the object in the main image file.

The method can be repeated several times if required to obtain more physical properties from the objects or better the resolution through interpolation of different scans The method may further include the steps of:

obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information;

provide the database containing physical information about the object to the software filter for adjusting the contrast in order to be used by said software filter and optimize the contrast adjustment;

providing the database containing physical information about the object to each of the files containing the description of geometric elements that better represent the outer edges of the object contained in the correspondent separate file and the position information of the object in the main image file.

If the image acquisition unit is capable to move in two axis, the position information will include position information of the image acquisition unit with respect to both axis.

In a second embodiments of the method of the present invention, the electronic processing means may be associated with an apparatus in which the telecentric lenses of the image acquisition unit, may be of such size that it is not necessary to move the image acquisition unit in order to capture the an image size corresponding to the whole transparent capture surface.

In such embodiment, the electronic processing means only need to obtain one file containing a raster image corresponding to the whole object being scanned, and therefore, the method would comprise:

a) obtaining scanning information from the image acquisition unit having one or more telecentric lens comprising one main image file containing a raster image corresponding to the image being scanned by the image acquisition unit;

b) adjusting the contrast of the main image file by means of any suitable software filter, until the contour of the scanned object is defined and the image is able to be processed by a software filter for obtaining the outer edges of an object contained in an image file;

c) removing dust or blemishes from the main image file by employing any known software filter that removes artifacts smaller than a preset size and characteristics;

d) detecting individual forms representing separate objects in the main image file, and separating each individual form in a separate image file, further including in each separate image file, the positioning information of each raster image in the main image file and saving the actual space that said individual forms occupied in the main image file, by using a software filter; and e) obtaining the outer edges of the individual forms contained in each separate image file using any suitable software filter, and for each separate image file, generating a file containing the description of geometric elements that better represent the outer edges of the object contained in the correspondent separate file and the position information of the object in the main image file.

The second embodiment of the method may further include the steps of:

obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information;

providing the database containing physical information about the object to the software filter for adjusting the contrast in order to be used by said software filter and optimize the contrast adjustment;

providing the database containing physical information about the object to each of the files containing the description of geometric elements that better represent the outer edges of the object contained in the correspondent separate file and the position information of the object in the main image file.

Finally it must be understood that the method and apparatus for obtaining 2D silhouettes from one or more 3D objects, of the present invention, is not limited exclusively to the embodiment above described and that the persons having ordinary skill in the art can, with the teaching provided by the invention, to make modifications to the method and apparatus for obtaining 2D silhouettes from one or more 3D objects of the present invention, which will clearly be within of the true inventive concept and of the scope of the invention which is claimed in the following claims.

I claim:

1. An apparatus for obtaining 2D silhouettes from one or more 3D objects comprising:
   a supporting structure;
   a transparent capture surface attached to the supporting structure, where objects to be scanned are placed;
   a backlight located directly over the transparent capture surface; and
   an image acquisition unit using a telecentric lens system, located directly below the transparent capture surface, said image acquisition unit capable of scanning the whole area of the transparent capture surface, thus capturing an optical image of an object placed on the transparent capture surface, converting said optical image into an electronic signal and providing said the electronic signal to electronic processing means,
   wherein the image acquisition unit comprises:
   a first telecentric lens, located parallel to the transparent capture surface;
   a mirror located below the first telecentric lens at an angle of approximately 45° with respect to an axis located parallel to the transparent capture surface, said mirror deflecting the light entering the image acquisition unit through the first telecentric lens, at an angle of 90°;
   one or more telecentric lenses located next to the focusing lens and parallel to the focusing lens, said one or more telecentric lenses perpendicularly receiving the light passing through the focusing lens, and focusing the light on a specific point;
   an image sensor, located next to the one or more telecentric lenses and parallel to the one or more telecentric lenses, receiving the light focused by said one or more telecentric lens (the optical image), said imaging sensor capturing the optical image and converting said optical image into an electronic signal and provides the electronic signal to electronic processing means.

2. The apparatus for obtaining 2D silhouettes from one or more 3D objects as claimed in claim 1, wherein the image acquisition unit further comprising a focusing lens located next to the mirror and perpendicular to the first telecentric lens, perpendicularly receiving the light deflected by the mirror.

3. The apparatus for obtaining 2D silhouettes from one or more 3D objects as claimed in claim 1, wherein the image acquisition unit is mounted over a mechanism controlled by electronic control means for automatically moving the imaging acquisition unit along the length of the transparent capture surface as needed for scanning an object placed over the transparent capture surface.

4. The apparatus for obtaining 2D silhouettes from one or more 3D objects as claimed in claim 1, wherein the image acquisition unit is mounted over a mechanism controlled by electronic control means, for automatically moving the imaging acquisition unit along the length and width of the transparent capture surface as needed for scanning an object placed over the transparent capture surface.

5. The apparatus for obtaining 2D silhouettes from one or more 3D objects as claimed in claim 2, further comprising one or more absolute position sensors, for obtaining position information of the movable image acquisition unit, and provide said position information to the mechanism in order to improve position accuracy and reliability without the need of manual adjustments.

6. The apparatus for obtaining 2D silhouettes from one or more 3D objects as claimed in claim 1, wherein the backlight comprises a telecentric backlight.

7. A method for obtaining 2D silhouettes from one or more 3D objects with the apparatus according to claim 1, comprising:

a) obtaining scanning information from the image acquisition unit having one or more telecentric lens, comprising one main image file containing a raster image corresponding to the image being scanned by the image acquisition unit;

b) adjusting the contrast of the main image file by means of any suitable software filter, until the contour of the scanned object is defined and the image is able to be processed by a software filter for obtaining the outer edges of an object contained in an image file;

c) removing dust or blemishes from the main image file by employing any known software filter that removes artifacts smaller than a preset size and characteristics;

d) detecting individual forms representing separate objects in the main image file, and separating each individual form in a separate image file, further including in each separate image file, the positioning information of each raster image in the main image file and saving the actual space said individual forms occupied in the main image file, by using a software filter; and e) obtaining the outer edges of the individual forms contained in each separate image file using any suitable software filter, and for each separate image file, generating a file containing the description of geometric elements that better represent the outer edges of the object contained in the correspondent separate file and the position information of the object in the main image file.

8. The method for obtaining 2D silhouettes from one or more 3D objects as claimed in claim 7, further comprising:
obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information.

9. The method for obtaining 2D silhouettes from one or more 3D objects as claimed in claim 7, further comprising:
obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information; and
providing the database containing physical information about the object to the software filter for adjusting the contrast in order to be used by said software filter and optimize the contrast adjustment.

10. The method for obtaining 2D silhouettes from one or more 3D objects as claimed in claim 7, further comprising:
obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information; and
providing the database containing physical information about the object to each of the files containing the description of geometric elements that better represent the outer edges of the object contained in the correspondent separate file and the position information of the object in the main image file.

11. A method for obtaining 2D silhouettes from one or more 3D objects with the apparatus according to claim 1, comprising:

a) obtaining sequential scanning information from the image acquisition unit having one or more telecentric lens comprising one or more files containing a raster image corresponding to the image being scanned by the image acquisition unit as it moves along a scanning area;

b) provide each file containing a raster image, with positioning information corresponding to the position of the image acquisition unit corresponding to the raster image, obtained from absolute position sensors located along the path of the movable image acquisition unit;

c) sequentially assembling the one or more files containing a raster image, in accordance with its positioning information in one main image file corresponding to a complete image of the scanning area, preserving the positioning information of each raster image;

d) adjusting the contrast of the main image file by means of any suitable software filter, until the contour of the scanned object is defined and the image is able to be processed by a software filter for obtaining the outer edges of an object contained in an image file;

e) removing dust or blemishes from the main image file by employing any known software filter that removes artifacts smaller than a preset size and characteristics;

f) detecting individual forms representing separate objects in the main image file, and separating each individual form in a separate image file, further including in each separate image file, the positioning information of each raster image in the main image file and saving the actual space that said individual forms occupied in the main image file, by using a software filter; and g) obtaining the outer edges of the individual forms contained in each separate image file using any suitable software filter, and for each separate image file, generating a file containing the description of geometric elements that better represent the outer edges of the object contained in the correspondent separate file and the position information of the object in the main image file.

12. The method for obtaining 2D silhouettes from one or more 3D objects as claimed in claim 11, further comprising:
obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information.

13. The method for obtaining 2D silhouettes from one or more 3D objects as claimed in claim 11, further comprising:
obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information; and
providing the database containing physical information about the object to the software filter for adjusting the contrast in order to be used by said software filter and optimize the contrast adjustment.

14. The method for obtaining 2D silhouettes from one or more 3D objects as claimed in claim 11, further comprising:
   obtaining physical information of the object being scanned, such as the height of the object, color information by means of the image acquisition unit, weight by means of a weight sensor, and any other physical information that may be useful to adjust the contrast of the main image file and to obtain the outer edges of the individual forms and generating a file containing a database containing such physical information; and
   providing the database containing physical information about the object to each of the files containing the description of geometric elements that better represent the outer edges of the object contained in the correspondent separate file and the position information of the object in the main image file.

15. The apparatus for obtaining 2D silhouettes from one or more 3D objects as claimed in claim 1, one or more absolute position sensors, for obtaining position information of the movable image acquisition unit, and provide said position information to the mechanism in order to improve position accuracy and reliability without the need of manual adjustments.

\* \* \* \* \*